United States Patent
Engstrand et al.

(12)

(10) Patent No.: US 6,224,269 B1
(45) Date of Patent: May 1, 2001

(54) CONNECTION MEANS FOR OPTICAL FIBRES

(75) Inventors: Jan-Åke Engstrand, Tråangsund; Hans-Christer Moll, Enskede, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/200,606

(22) Filed: Nov. 30, 1998

(30) Foreign Application Priority Data

Dec. 1, 1997 (SE) .................................................. 9704466

(51) Int. Cl.⁷ ...................................................... G02B 6/36
(52) U.S. Cl. .............................. 385/59; 385/120; 385/121
(58) Field of Search ................................... 385/115, 116, 385/120, 121, 59, 71, 89

(56) References Cited

U.S. PATENT DOCUMENTS

| | | | |
|---|---|---|---|
| 3,473,872 | * 10/1969 | Okamura | 385/121 |
| 5,367,596 | * 11/1994 | Chow | 385/116 |

FOREIGN PATENT DOCUMENTS

0458608 A1   1/1991   (EP) .

OTHER PUBLICATIONS

International Search Report, Oct. 1998.

* cited by examiner

*Primary Examiner*—Hung N. Ngo
(74) *Attorney, Agent, or Firm*—Burns, Doane, Swecker & Mathis, L.L.P.

(57) ABSTRACT

The present invention relates to an optical connection means arranged in order to rearrange and connect optical fibers connected to the connection means. In order to simplify handling of optical fiber ribbons, so-called fiber ribbons, an optical connection means with an integrated cross-connection (2) has been produced with which component optical fibers (3) connected to the component can be rearranged such as cross-connected and connected via an interface (4). With an optical cross-connection of the "sidings" type integrated with a so-called MT-connector interface from for example a four-fiber transmitter array and a four-fiber receiver array an eight-fiber MT-connector interface with alternate transmitter respective receiver fibers next to each other can be obtained.

17 Claims, 2 Drawing Sheets

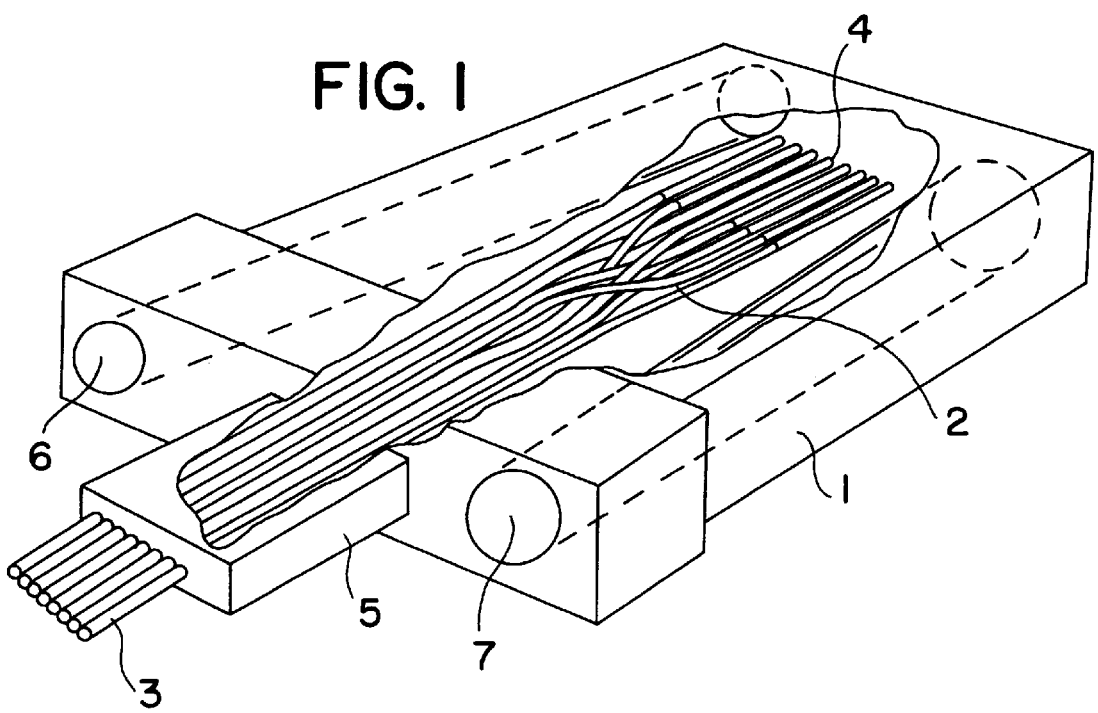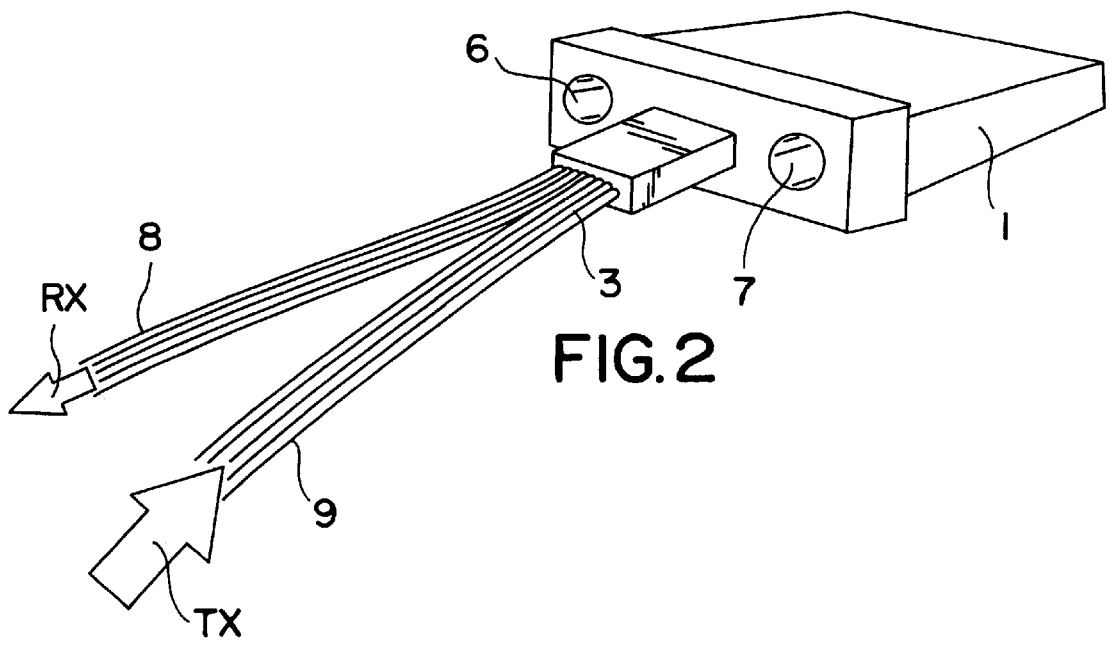

CONNECTION MEANS FOR OPTICAL FIBRES

TECHNICAL FIELD

The present invention relates to an optical connection means arranged to be able to rearrange and connect optical fibres connected to the connection means.

STATE OF THE ART

From EP-0 458 608 A1 is known a connecting means for optical fibres having an integrated optical circuit which permits a reconfiguration of an optical system in the connection means.

DESCRIPTION OF THE INVENTION

In order to simplify the handling of optical fibre ribbons, so called fibre ribbons, a component, an optical connection means, a so called MT-connector with integrated cross-connections has been developed, with which component optical fibres connected to the component can be rearranged e.g. cross-connected and connected via an interface. The invention will be described more closely with the help of preferred embodiments and with reference to the accompanying figures.

Today developments are heading towards more cost effective solutions at the circuit board level, e.g. four transmitters such as laser transmitters or four receivers can be built together on a single chip, a so called array. Such chips in turn can be encapsulated in a single capsule and in this case a four channel array transmitter or receiver can be obtained well packaged for mounting on a circuit board. During allocation to a subscriber it is desirable to be able to draw out a fibre from each of a transmitter and a receiver and consequently to obtain a bi-directional two-fibre link where the transmitter fibre and receiver fibre lie immediately beside each other. In order to obtain this configuration a sort of optical cross coupling of the "sidings" type is required. With such a "sidings" integrated with a so-called MT-connector interface from for example a four-fibre transmitter array and a four-fibre receiver array an eight-fibre MT-connection interface can be obtained with alternating transmitter respective receiver fibres next to each other. The cross connecting itself—"sidings"—can either be integrated completely in the connector itself or can be inside a lengthened break protection in direct connection to the connector.

DESCRIPTION OF THE FIGURES

FIG. 1 shows simplified, partially sectional, a connecting means according to the invention of the eight-fibre MT-connector type with an integrated cross-coupling and an integrated eight-fibre ribbon.

FIG. 2 shows simplified how the eight-fibre ribbon from the connector in FIG. 1 is splitable 2×4 fibre ribbons.

PREFERRED EMBODIMENTS

Figure 3:
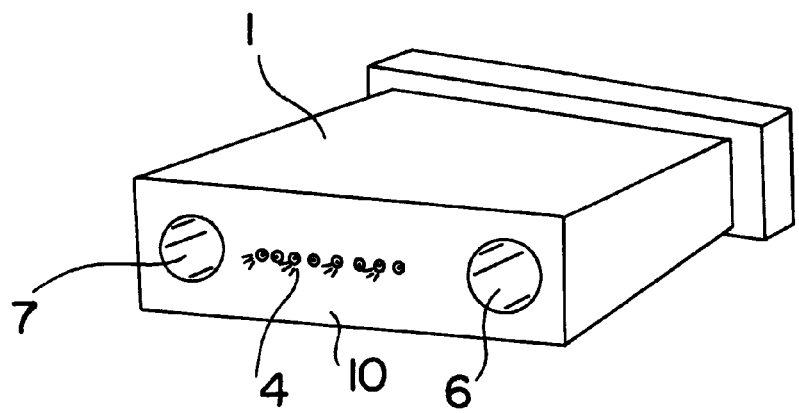
FIG. 3 shows simplified the MT-connector in FIG. 1 from a second side.

The optical connection means 1 can, like in FIG. 1, be an eight-fibre MT-connector, essentially consisting of a plastic casing surrounding the rearranged optical fibres like the cross-connected optical fibres 2, and having the free optical fibre ends 3 of the optical fibres connected to the plastic casing on one side and an optical fibre interface 4 on the other side of the connection means. The optical fibre ribbon ends can consequently be connected to the optical fibre interface 4 on the connection means and reconfigured or cross-connected output optical fibres can be obtained from the connecting means.

FIG. 1 shows simplified how an eight-fibre MT-connector with the integrated optical cross-connection 2 can appear. The placement of the integrated cross-connection 2 depends on the existing space in the casing of the connector, if the cross-connection of the optical fibres is glued into the connector or if the connector is moulded directly onto the optical fibres and the cross-connection, but does not form any limitation and four-equally 12-optical fibres can be comprised in the concept according to the above. In the figure a break protection 5 connected to the MT-connector on the front side and an interface 4 with free optical fibre ends on the rear side are also shown. The connector also has parallel circular guide holes 6 and 7 for the accurate alignment and fastening of the connector with the guide pins on a contact connector.

FIG. 2 shows how the input eight-fibre ribbon has been divided into 2×4 fibres/four-fibre ribbons 8 and 9 where one of the four-fibre ribbons 8 is intended to be connected to a four-channel array receiver module and the other four-fibre ribbon 9 is intended to be connected to a four-channel array transmitter module.

In FIG. 3 the MT-connector is shown from the other side 10 with the so called MT-8 connector interface 4 where alternate fibres are transmitters and alternate fibres are receivers.

Figure 4:
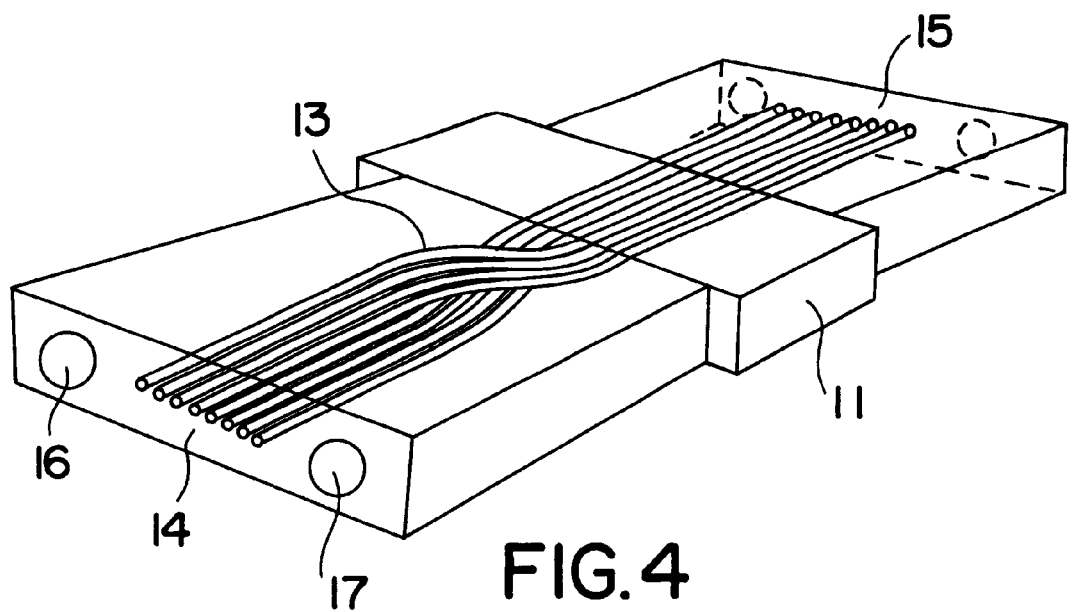
FIG. 4 shows simplified an alternative embodiment of an eight-fibre MT-connector according to the invention with an integrated cross-connection and with an MT-connector interface at both ends.

FIG. 4 shows an alternative embodiment of a connection means 11 according to the invention with an integrated cross-connection 13 and with MT-connection interfaces 14 and 15 at both ends. With this connection means a fibre ribbon with an MT-connection interface is connected to the connection means whereby the connected optical fibres will be cross-connected in the connection means and during connection to e.g. a four-channel transceiver capsule with an MT-8 interface dividing up into a transmitter side and a receiver side can be obtained. The connection means can be aligned with its guide holes 16 and 17 with guide pins/guide pegs and fastened onto e.g. the transceiver capsule with some type of snap fastening or metal plate or the like. A cross-connecting component according to the above with an MT-connector interface at each end and with integrated cross-connection can be manufactured through direct moulding of the connector body around the cross-connected fibres.

The use of fibre ribbons in combination with ribbon welding and optical connection means simplifies the work considerably during the installation of fibre optical networks. It is especially important in access networks where the cost determines when the optical fibre can be drawn all the way home to the subscriber (FTTH, Fibre To The Home). It is therefore desirable to be able to retain the fibre ribbon undivided even during cross-connection or other rearranging of the optical fibres.

The use of the optical connection means with fibre ribbons is advantageous when for example there is a requirement for cross-connection or other rearranging of signals from transmitter- and receiver arrays on an electronic board.

An optical connection means according to the invention can be manufactured starting from a suitable number of fibre ribbons one end of which have been joined together, liberated and rearranged e.g. cross-connected. The joined-together and rearranged optical fibres are fixed in the connection means through for example baking-in in plastic, whereby the cross-sectional surfaces of the fibre ends in the interface form the optical interface of the fibre end surfaces of the connected fibre ribbons. A fibre organiser can be used to organise the optical fibres in the optical connection means. The cross-connection zone, mixing point or weave zone formed can then be encapsulated between two casings possibly filled with an elastic material.

The invention is naturally not limited to the embodiments described above and shown in the drawings but can be modified within the scope of the accompanying patent claims.

What is claimed is:

1. An optical fiber connector comprising:
   a housing in which a plurality of optical fibers extend between a first and a second end of said housing;
   wherein said optical fibers are arranged in a first order at said first end and said optical fibers are arranged in a second order at said second end, and wherein said first end is an input optical fiber interface arranged as an MT-connection.

2. The optical fiber connector of claim 1, wherein said optical fibers change from said arrangement in said first order to said arrangement in said second order at an integrated cross-connection.

3. The optical fiber connector of claim 1, wherein said second end is an output optical fiber interface arranged as an MT-connection interface.

4. The optical fiber connector of claim 2, wherein the integrated cross-connection of said optical fibers is glued into said optical fiber connector.

5. The optical fiber connector of claim 2, wherein the integrated cross-connection of said optical fibers is molded into said optical fiber connector.

6. The optical fibre connector of claim 1, wherein said first order is arranged such that said optical fibers are grouped together as a first group and a second group, wherein said first group is connected to a transmitter and said second group is connected to a receiver, and wherein said second order is arranged serially such that said optical fibers alternate between optical fibers connected to the transmitter and receiver.

7. An optical fiber connector comprising:
   a housing in which a plurality of optical fibers extend between a first and a second end of said housing;
   wherein said optical fibers are arranged in a first order at said first end and said optical fibers are arranged in a second order at said second end,
   wherein said first order is arranged such that said optical fibers are grouped together as a first group and a second group, wherein said first group is connected to a transmitter and said second group is connected to a receiver, and
   wherein said second order is arranged serially such that said optical fibers alternate between optical fibers connected to the transmitter and receiver.

8. The optical fiber connector of claim 7, wherein said optical fibers change from said arrangement in said first order to said arrangement in said second order at an integrated cross-connection.

9. The optical fiber connector of claim 7, wherein said first end is an output optical fiber interface arranged as an MT-connection interface.

10. The optical fiber connector of claim 7, wherein said second end is an output optical fiber interface arranged as an MT-connection interface.

11. The optical fiber connector of claim 7, wherein said first and second ends are arranged as MT-connection interfaces.

12. The optical fiber connector of claim 8, wherein the integrated cross-connection of said optical fibers is glued into said optical fiber connector.

13. The optical fiber connector of claim 8, wherein the integrated cross-connection of said optical fibers is molded into said optical fiber connector.

14. Optical connections means provided for cross-connecting optical fibers connected to the connections means, wherein a cross-connection is integrated with the connection means as molded into or glued fast into the connection means, in that the connection means is provided to be connectable on two sides to optical fibers, and wherein first optical fibers can be connected to the connection means on one side of the connection means and be cross-connected with the connection means to second optical fibers connected with the connection means to second optical fibers connected to the other side of the connection means.

15. Optical connection means according to claim 14, wherein an outgoing optical fiber interface is arranged on the output side like an MT-connection interface.

16. Optical connection means according to claim 14, wherein an input optical fiber interface is arranged on the input side like an MT-connection interface.

17. Optical connection means according to claim 14, wherein both the input side and the output side are arranged as optical fiber interfaces of MT-connector interface type.

* * * * *